April 22, 1924.
D. C. PRINCE
CONTROL SYSTEM
Filed Feb. 19, 1921
1,491,420
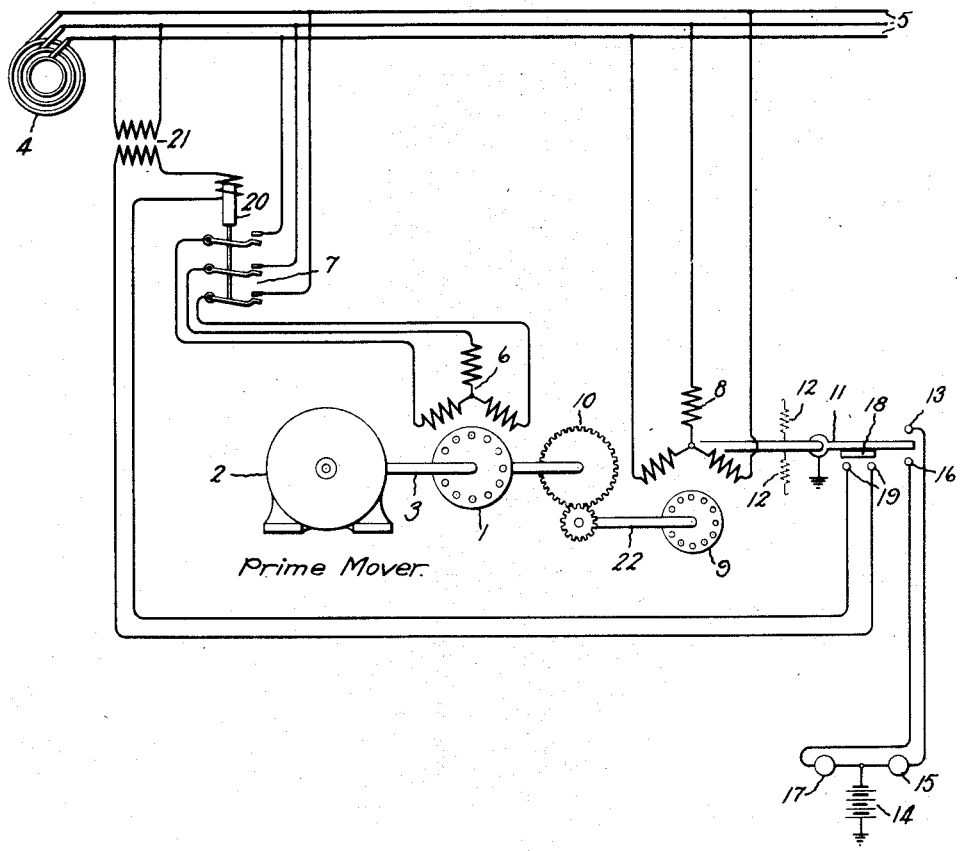
Inventor:
David C. Prince,
by Albert G. Davis
His Attorney.

Patented Apr. 22, 1924.

1,491,420

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

CONTROL SYSTEM.

Application filed February 19, 1921. Serial No. 446,512.

*To all whom it may concern:*

Be it known that I, DAVID C. PRINCE, a citizen of the United States, residing at Schenectady, in the county of Schenectady, State of New York, have invented certain new and useful Improvements in Control Systems, of which the following is a specification.

My invention relates to control systems and more particularly to a system which renders it possible to connect rotating apparatus to a source of current without causing undue disturbance.

When two alternating current generators are to be paralleled it is important that both machines be operating at exactly the same speed and that their generated electromotive forces be not too far apart in phase. Such an accurate control, however, is not necessary when one of the alternating current generators happens to be of the so-called induction generator type. In an induction generator, especially when it is of large capacity, it is best however to connect the generator to the mains when it is rotating at or near synchronism but it is quite unnecessary to take extreme care as to the relative phase relations, etc. When the induction generator is at or near synchronism there is not any great disturbance on the line when it is connected, although the machine may be relatively large. With the aid of my invention it is not only possible to determine when the induction generator is up to speed, but I also provide means for automatically connecting the generator to the line at that point. From another aspect, my invention is not limited to the induction generator controlling means but may be used for performing a switching junction or for signalling when a rotatable member of any sort comes up to a certain predetermined speed. My invention comprises relatively simple parts and is adapted to operate in response to predetermined speed conditions irrespective of the phase relations of the induction generator and the mains.

For a better understanding of my invention reference is to be had to the specification as well as the accompanying drawing, in which the single figure is a diagrammatic wiring scheme showing a complete installation for automatically connecting the induction generator in multiple with another source of current.

Referring now more in detail to the drawing, the rotatable member 1, the machine which it is desired to control, is shown in this case as an induction generator which is driven by means of a prime mover 2 connected to the shaft 3 of the induction generator 1. A source of alternating current, in this case a polyphase generator 4, connects to mains 5, and it is with this generator that the induction generator 1 is to be connected, so that it may also supply mains 5 with power, and be excited from the generator 4. The stationary member 6 of the induction generator 1 is so arranged that it may be connected to the mains 5 by means of the switch 7 after the induction generator has attained a speed near synchronism with the generator 4.

For determining whether the rotating machine is near synchronism, I provide an auxiliary device comprising a small induction type of machine, shown in general at 22. This machine has means for producing a rotating magnetic field, such as the primary member 8, adapted to be connected to the mains 5. This primary member 8 is arranged for a limited angular rotation in any appropriate manner. Cooperating with this primary member is a closed circuited secondary member 9, shown in this case as of the ordinary squirrel cage type. This secondary member 9 is mechanically connected to the generator so that it is driven therefrom and so that it is rotated at a rate proportional to that of the induction generator. For reducing the size of the auxiliary machine 22, I may arrange to drive the member 9 at a higher speed than that of the shaft 3 by appropriate gearing 10. This may always be done when the induction generator 1 has more than two poles, for then the small induction machine 22 may be wound to produce a lower number of poles. This would require that its rotor have a higher speed than the machine 1 at synchronism. When the rotatable secondary member 9 is rotated at a speed corresponding to synchronous speed of the induction generator, then there is no torque created between the members 8 and 9, since the rotating field set up in the primary member 8 is so arranged that it keeps exactly in step with the rotation of member 9. Should the speed of the member 9 be less than that required, then the member 8 has a tendency to rotate, say, in a counter clockwise direction, while if the speed of 9 is greater than that corresponding to synchronous speed of induction generator 1, then the torque is in a clockwise direction. Since the member 8 is mounted so as to permit of a slight angular rotation, the torque is made use of to produce a slight rotational movement and thereby to perform either a switching or an indicating function.

For performing these results I mechanically connect a switch member 11 to the primary member 8, which switch member is held normally in a central position by means of the two springs 12. When the induction generator is started the primary member 8 rotates slightly in a counter clockwise direction and carries with it the switch member 11 which is so arranged that it contacts with the upper contact member 13 arranged above the member 11, and a circuit is completed through the battery 14 and signal lamp 15, through contact 13, member 11 and through the ground, back to the battery. The lamp 15 therefore lights and shows that the speed is considerably less than that corresponding to synchronism. As the speed approaches synchronism the counter clockwise torque becomes less and less until it finally ceases entirely and then lamp 15 goes out, due to the return of member 11 to central position. At a speed slightly above synchronism the torque is reversed and causes the member 11 to be rotated so as to contact with the contact point 16. This completes the circuit for the signal lamp 17 which shows that the generator has already reached synchronism and is now rotating slightly faster than that rate. The operator is instructed to throw in the switch 7 to connect primary 6 of the generator to the line when both lights are out, or when lamp 17 is just lit. However, this function may be performed automatically upon the movement of the member 11 in a clockwise direction. For this purpose I provide an insulated contact bar 18 carried on the under side of the member 11 which is adapted to complete the circuit between the two stationary contacts 19 upon the clockwise movement of member 11. The circuit completed by the bridging of the two contacts 19 causes the solenoid 20 to be energized from the secondary of the potential transformer 21. The solenoid 20 may be directly connected with the switch blade 7 so that it pulls up the switch blades to connect the primary member 6 to the mains, but so arranged that subsequent deenergization of solenoid 20 does not open the switch. Of course it is to be understood that any other well known means for electro-mechanically performing the switching function may be substituted for the means I have shown.

It is evident that I have provided a means for controlling an induction generator that is extremely simple and inexpensive. Furthermore, while I have shown but one embodiment of my invention I do not wish to be limited thereto but aim to embrace in the appended claims all modifications falling fairly within the scope of my invention.

What I claim as new and desire to secure by Letters Patent of the United States, is:—

1. In combination, a rotatable member, and means arranged to perform switching functions under predetermined speed conditions of said rotatable member comprising means adapted to be connected to a source of alternating current for producing a rotating magnetic field and a cooperating closed circuited secondary member, one of said two latter elements being arranged to rotate at a rate proportional to that of the rotatable member and the other of said means being arranged to be biased from a normal position by a non-synchronous relation between said rotating magnetic field and said secondary member.

2. In an electrical system, a source of alternating current, a rotating machine arranged to be connected to said source, and means for connecting said machine to the source when it is rotating in approximate synchronism with the frequency of the source comprising means connected to the source for producing a rotating field and a cooperating closed circuited secondary member driven from the rotating machine one of said cooperating elements being provided with resilient means tending to resist relative movement between said element and its support, and a switch controlled by said movement.

3. In an electrical system, a source of alternating current, a rotating machine arranged to be connected to said source, and means for determining whether the rotating machine is near to synchronism with the source comprising means connected to the source for producing a rotating field, a cooperating closed circuited secondary induction member driven from the rotating machine and indicating means controlled by said cooperating elements.

4. In an electrical system, a source of alternating current, an induction generator adapted to be connected to the mains of said source, means for driving said induction generator, and means for connecting said generator to the mains comprising a primary member connected to the source for producing a rotating magnetic field and arranged for a limited angular rotation, a cooperating closed circuited secondary member mechanically connected to the generator, and switching means adapted to be operated by the rotation of the primary member.

5. In an electrical system, a source of alternating current, an induction generator adapted to be connected to the mains of said source, means for driving said induction generator, and means for determining whether the induction generator is near to synchronism with the source comprising a primary member connected to the source and arranged for a limited angular rotation, a cooperating closed circuited secondary member mechanically connected to the generator, and signalling means adapted to be operated by the rotation of the primary member.

In witness whereof, I have hereunto set my hand this 18th day of February, 1921.

DAVID C. PRINCE.